United States Patent
Rakijas et al.

(10) Patent No.: US 6,269,324 B1
(45) Date of Patent: Jul. 31, 2001

(54) MAGNETIC OBJECT TRACKING BASED ON DIRECT OBSERVATION OF MAGNETIC SENSOR MEASUREMENTS

(75) Inventors: Michael Rakijas, Yorba Linda; Anthony Saglembeni, Tustin; Kirk K. Kohnen, Fullerton; Harold C. Gilbert, Placentia, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/174,682

(22) Filed: Oct. 19, 1998

(51) Int. Cl.$^7$ .................................................. G01B 7/14
(52) U.S. Cl. ..................... 702/190; 702/150; 702/151; 324/207.11; 324/207.13; 324/207.14
(58) Field of Search ..................... 702/190, 150, 702/151; 324/207.13, 207.14, 207.11, 405, 463

(56) References Cited

U.S. PATENT DOCUMENTS 5,381,095 * 1/1995 Andrews ............................. 324/326
5,684,396 * 11/1997 Aks et al. ........................ 324/207.13
5,708,427 * 1/1998 Bush .................................. 340/941
5,831,873 * 11/1998 Kohnen et al. ..................... 702/150

OTHER PUBLICATIONS

Dassot, Gilles, Chichereau, Claire, Blanpain, Roland, "Data Association and Tracking From Acoustic Doppler and Magnetic Measurements", European Signal Processing Conference, 1996.

Moorman, Martin J., Bullock, Thomas E., "A Federated Extended Kalman Filter with Application to Passive Target Tracking", Natl. Aerospace and Electronics Conference, 1993.

* cited by examiner

Primary Examiner—Kamini Shah
Assistant Examiner—Hien Vo
(74) Attorney, Agent, or Firm—Colin M. Raufer; Leonard A. Alkov; Glenn H. Lenzen, Jr.

(57) ABSTRACT

A magnetic object tracking algorithm, that may be implemented as an apparatus or a method, that permits kinematic tracking of magnetized objects, or targets, using magnetic field strength measurements derived from one or more vector magnetometers. The magnetic object tracking algorithm effectively tracks a maneuvering magnetic dipole target using an extended Kalman filter directly observing (processing) real magnetic field strength data.

20 Claims, 2 Drawing Sheets

MAGNETIC OBJECT TRACKING BASED ON DIRECT OBSERVATION OF MAGNETIC SENSOR MEASUREMENTS

BACKGROUND

The present invention relates generally to the tracking of magnetic source objects, and more particularly, to a data processing algorithm that permits kinematic tracking in real time of one or more magnetized objects, using a series of magnetic field strength measurements, vector components or total field, collected from one or more magnetometers.

Numerous opportunities exist for sensor systems that can track objects which generate magnetic fields. All types of land vehicles, ships, and aircraft have structural and power systems capable of generating substantial magnetic signatures. Even small inert objects such as firearms and hard tools may exhibit sufficient magnetization to be observed from a distance. Over the past several years, the assignee of the present invention has developed various types of magnetic sensor data processing algorithms and systems capable of localizing, quantifying, and classifying such objects based on their magnetostatic fields. The present invention extends this capability to real time tracking in a way that greatly simplifies solution of the nonlinear field equations.

A magnetostatic field may be generated by any combination of three physical phenomena: permanent or remanent magnetization, magnetostatic induction, and electromagnetic induction. The first occurs in objects that contain metals of the ferromagnetic group, which includes iron, nickel, cobalt, and their alloys. These may be permanently magnetized either through manufacture or use. Second, the Earth's magnetostatic field may induce a secondary field in ferromagnetic structures and also paramagnetic structures if the mass and shape sufficiently enhance the susceptibility. Third, the object may comprise a large direct current loop that induces its own magnetic field. This is often the case with land vehicles that use the vehicle chassis as a ground return.

Tracking objects by sensing and data processing their magnetostatic fields offers several advantages over other methods. One is that the process is passive rather than active. This eliminates potential health and safety hazards that could be associated with some types of active sensor systems, such as those which use various types of electromagnetic radiation. A passive system also permits covert observation, useful to military and intelligence operations as well as law enforcement. Another advantage is that the field is mostly unaffected by natural boundaries, such as space above and the sea or land surface below. It is also unaffected by many adverse environmental conditions such as wind, fog, thunderstorms, and temperature extremes. Yet another advantage is that the magnetostatic field of the tracked object is difficult to conceal or countermeasure, and is therefore useful against hostile subjects.

RELATED ART

As a result of continuing research and development, the assignee of the present invention has previously filed developed inventions relating to magnetic sensor systems and data processing of magnetic field measurements. To date these have been primarily concerned with detecting, locating, and classifying magnetic objects based on a large set of measurements distributed over space and/or time. The first method to be introduced was the dipole detection and localization (DMDL) algorithm disclosed in U.S. Pat. No. 5,239,474, issued Aug. 24, 1993. This algorithm assumes that the field of a magnetic source object is well represented as the field of a magnetic dipole moment at distances far removed from the source. The location of the dipole is determined by maximizing an objective function over a grid of search points that spans the search volume. Two limitations of this method are the assumption of a linear array of sensors and the need to search over all possible dipole orientations if the orientation is unknown.

This original invention was augmented by two subsequent inventions. The first invention, disclosed in U.S. Pat. No. 5,337,259, issued Aug. 9, 1994, provided for three improvements to DMDL processing. The first improves spatial resolution yielding a more definitive localization; the second uses higher order mutipole terms in the Anderson function expansion to increase the signal to noise ratio (SNR); and the third introduces a multiple-pass, multiple-target localization method. The next invention, disclosed in U.S. Pat. No. 5,388,803, issued Feb. 17, 1995, extended the DMDL process to use in synthetic aperture arrays. This method permits a set of magnetic field measurements to be collected from a single moving sensor over a period of time in lieu of a large number of fixed sensors in a single instant.

Subsequent to these inventions, a substantially changed and improved DMDL processing algorithm (IDMDL) was developed by the assignee of the present invention which is disclosed in a U.S. patent application Ser. No. 08/611,291. The Anderson function expansion in spherical coordinates was replaced by a conventional electromagnetic field moment expansion in Cartesian coordinates. This change eliminates the requirement for a linear array of sensors and permits an arbitrary array geometry to be used. Also, range normalization and the search over unknown dipole orientations was eliminated by forming a unique estimate of the dipole moment within the objective function. An extension of the method estimates multiple dipole moment sources simultaneously.

The fundamental algorithm change in IDMDL substantially generalized the process and led rapidly to new processing extensions on several fronts. The first was spatial-temporal processing, disclosed in U.S. Pat. No. 5,684,396 issued Nov. 4, 1997. This extension permits the dipole source to be in motion and solves for the source object location as well as its velocity vector. When applied independently to short time intervals of measurements, it provides an approximate track of the object. The second extension was multipole dipole characterization, disclosed in U.S. Pat. No. 5,783,944 issued Jul. 21, 1998. This second extension replaces the dipole approximation with a set of spatially separated and independently oriented dipoles when the object is close or large. The dipole set provides a means of characterizing or classifying an object in the near field. A third extension permits both the remanent and induced components of the dipole source to be independently estimated as the source object rotates in the earth's magnetic field, and is disclosed in U.S. Patent application Ser. No. 08/789,032, filed Jan. 27, 1997.

Accordingly, it is an objective of the present invention to provide for a data processing algorithm that permits kinematic tracking in real time of one or more magnetized objects, using a series of magnetic field strength measurements, vector components or total field, collected from one or more magnetometers.

SUMMARY OF THE INVENTION

To accomplish the above and other objectives, the present invention provides for an algorithm, which may be implemented as an apparatus or a method, that permits kinematic tracking of magnetized targets (objects) using magnetic field strength measurements from one or more vector or total field magnetometers (magnetic field strength sensors). While kinematic tracking of targets using a variety of observables including range, bearing, Doppler shift, for example, has been well established for many years, the kinematic tracking of magnetized targets using magnetic field strength measurements from one or more vector or total field magnetometers provided by the present invention is unique. The present magnetic object tracking algorithm has been shown to effectively track a maneuvering magnetic dipole target using an extended Kalman filter directly observing real magnetic field strength data.

The present invention comprises a substantial change to algorithms of the prior art discussed above in that it is intended for use in tracking rather than in initially detecting or classifying the object. The present method begins with a source detection and approximate location provided by one of the prior methods and tracks the source continuously in real time as long as it is within range of the sensors. It is based on the conventional electromagnetic field moment equation but applies it to a Kalman filter observation equation instead of an objective function. It uses new measurement data sequentially over small sample intervals to track the source object and continuously improve the estimates of its location, velocity, and dipole moments.

As mentioned in the Background section, tracking of magnetic dipole targets detected by the dipole detection and localization algorithm disclosed in U.S. Pat. No. 5,239,474 has primarily involved maximizing the correlation between a magnetic field response associated with a hypothesized straight line swath and a set of 3MN observed magnetic samples, where M is the number of vector sensors and N is the number of time samples. The present algorithm may be applied directly to the 3M spatially observed magnetic data samples at every time sample to improve the kinematic tracking of the magnetic dipole over the previous swath approach.

More specifically, the present magnetic object tracking algorithm comprises the following steps. An array of magnetic field strength measurements derived from observing a magnetized target using a vector magnetometer is provided. State variables associated with the target that are to be tracked are selected. A Kalman filter is defined in terms of a plant equation that describes the evolution of the state of the target. A state vector of the target is defined by the state variables and an observation equation that describes a relationship between the observed magnetic field strength measurements and the state vector that is being tracked. The array of magnetometer measurements is processed using the Kalman filter based on the plant equation (describing the evolution of the state) and the observation equation to track the magnetic object.

The dipole detection and localization algorithm of U.S. Pat. No. 5,239,474 is not used in the present magnetic object tracking algorithm. The magnetic object tracking algorithm offers several advantages over current swath correlation techniques described in U.S. Pat. No. 5,684,396, for example. First, CPU processing time required for performing the Kalman filter prediction and update equations is significantly less than that required for swath processing. The swath technique requires a 6-dimensional search (the swath starting and ending positions) to determine a dipole track. Second, the magnetic object detection and tracking algorithm provides an estimate of the dipole state or location at every time sample (reduced latency), whereas swath processing requires several (N) temporal samples before a track can be established. Third, swath processing is optimal only if the target truly follows a straight line, constant speed track over the entire N sample observation period and maintains a constant magnetic dipole during this sampling interval. Any deviation from this straight line path or the constant dipole assumption and the magnetic object detection and tracking algorithm described herein yields better tracking accuracy and results. Fourth, the present invention has modeling flexibility, wherein, if the relationship between a target's direction of travel (or vehicle axis) and its magnetic multipole response is known, such information can be incorporated into the Kalman filter plant equation to provide for improved kinematic tracking performance by the present magnetic object detection and tracking algorithm.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
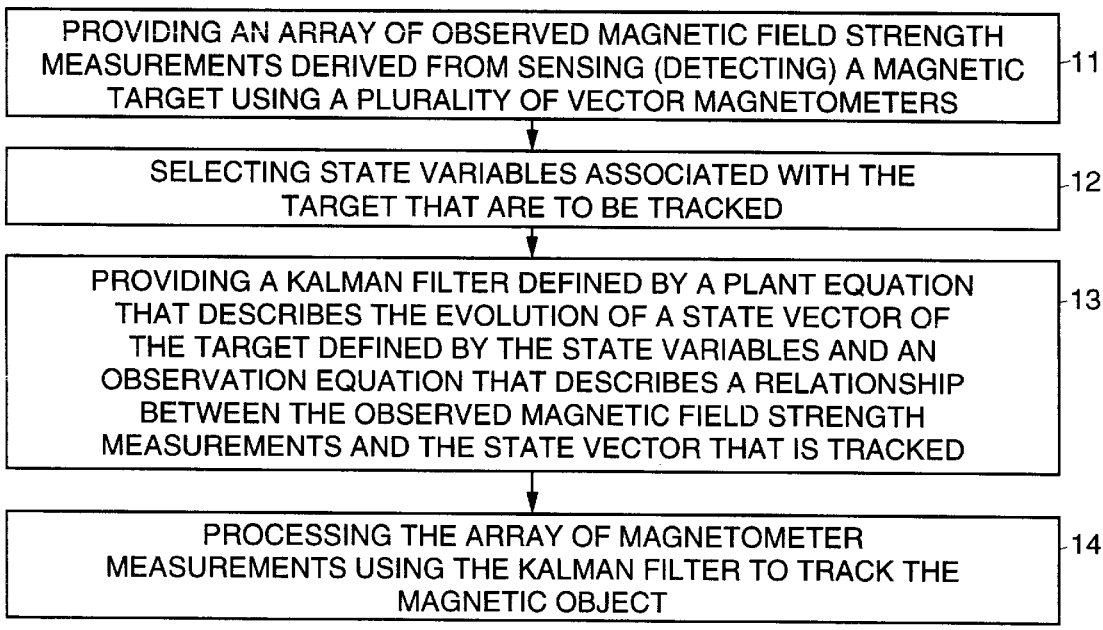
FIG. 1 is a flow diagram illustrating a magnetic object detection and tracking algorithm in accordance with the principles of the present invention.
Figure 2:
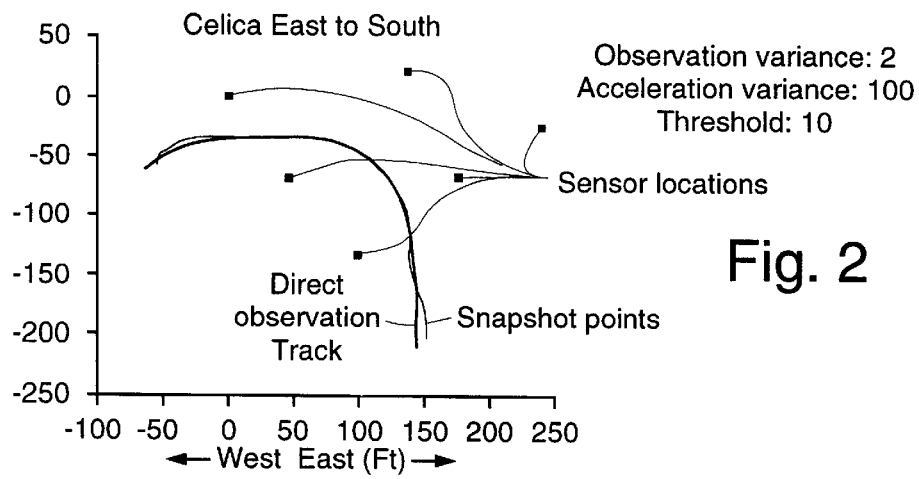
FIGS. 2–6 illustrate data comparing the Kalman tracking results of the present invention and position estimates associated with the DMDL algorithm.
Figure 3:
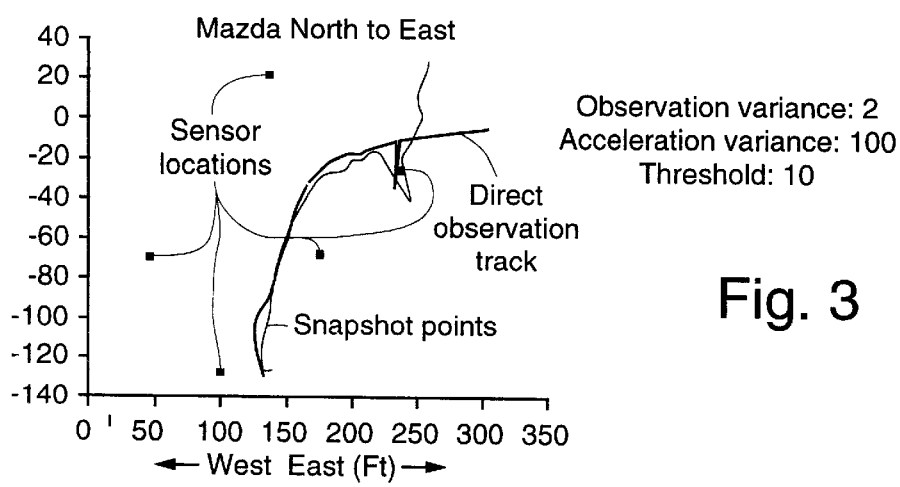
Figure 4:
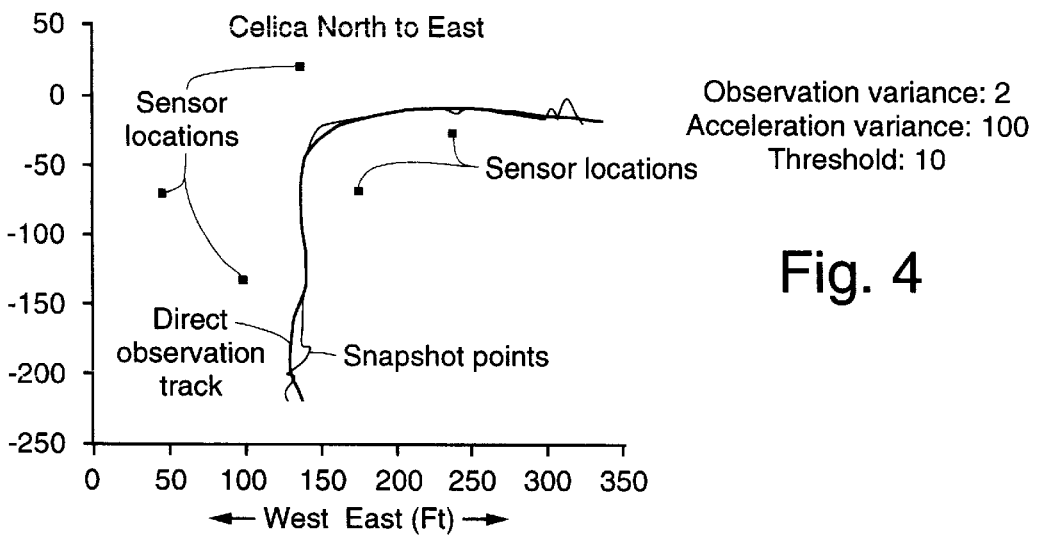
Figure 5:
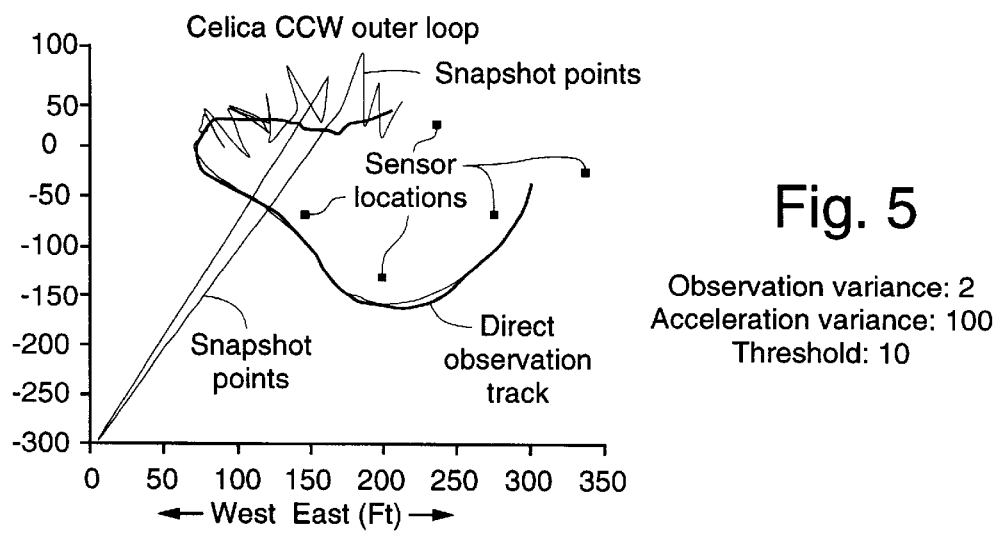
Figure 6:
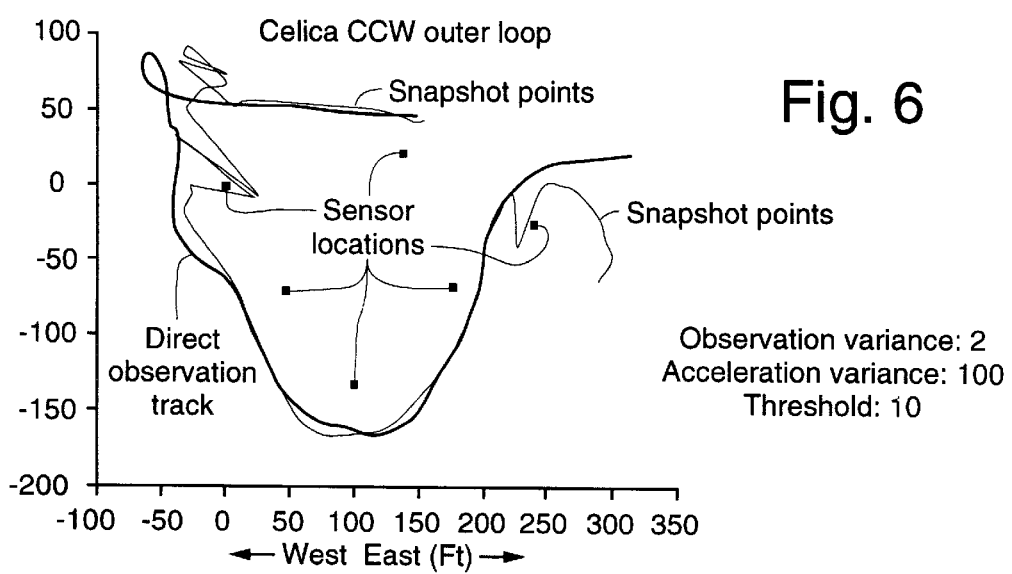

Referring to the drawing figures, FIG. 1 is a flow diagram illustrating a magnetic object tracking algorithm 10 in accordance with the principles of the present invention. The magnetic object tracking algorithm 10, which may be implemented as an apparatus or a method, provides for kinematic tracking of a magnetized target (object) using observed magnetic field strength measurements.

The magnetic object tracking apparatus 10 comprises one or more vector magnetometers 11 for providing an array of observed magnetic field strength measurements derived from detecting the object's magnetic field, a Kalman filter 13 defined by a plant equation that describes the evolution of a state vector of the object defined by state variables 12 associated with the object that is to be tracked and an observation equation that describes a relationship between the observed magnetic field strength measurements and the state vector that is tracked. A processor 14 is used to process the array of magnetometer measurements using the Kalman filter 13 to track the object.

The algorithm 10 may also be implemented by the following method steps. An array of observed magnetic field strength measurements derived from detecting a magnetized target using one or more vector magnetometers 11 is provided. State variables 12 associated with the target that is to be tracked are selected. A Kalman filter 13 is defined in terms of a plant equation that describes the evolution of a state vector of the target defined by the state variables and an observation equation that describes a relationship between the observed magnetic field strength measurements and the state vector that is tracked. The array of magnetometer measurements is processed 14 using the Kalman filter based on the plant equation and the observation equation to track the object.

The magnetic object tracking algorithm 10 provides for a general method that may be applied to any array of vector or total field (scalar) magnetometer measurements to improve tracking performance. The implementation of the Kalman filter used in the present magnetic object tracking algorithm 10 requires selection of the state variables to be tracked, a suitable plant equation to describe the evolution of the state, and an observation equation to describe the relationship between the observed magnetic field data and the state being tracked.

Although the implementation of the Kalman filter equations may be done in any coordinate system, the present invention is described in terms of a generalized rectangular coordinate system. The state is assumed to include target position, velocity, and magnetic dipole moment. The choice of state variables to be tracked is not limited to the parameters chosen for use in the disclosed embodiment. Target acceleration and/or time derivatives of the magnetic dipole may be incorporated into the state vector as well. The plant equation is based on a constant velocity model for the kinematics and a static model for the dipole characteristics of the target. The static model for the dipole moment implies no underlying physical model is being used to alter the state of the target's magnetic dipole moment. The equations of motion describing the evolution of the target state are given by:

$$r_{du}(k+1) = r_{du}(k) + T_s \dot{r}_{du}(k) \, u=i,j,k$$

$$\dot{r}_{du}(k+1) = \dot{r}_{du}(k), u=i,j,k$$

$$m_u(k+1) = m_u(k), u=i,j,k.$$

In these equations, i,j,k represent orthogonal directions in a rectangular coordinate system, and the d subscript indicates these coordinates describe the position of the dipole. The equations describing the dynamics can be written more succinctly by defining a state vector and state transition matrix, respectively:

$$\underline{x}(k) = [r_{di}(k) \; \dot{r}_{di}(k) \; r_{dj}(k) \; \dot{r}_{dj}(k) \; r_{dk}(k) \; \dot{r}_{dk}(k) \; m_i(k) \; m_j(k) \; m_k(k)]^T$$

$$A = \begin{bmatrix} a & & & \\ & a & & \\ & & a & \\ & & & I_3 \end{bmatrix}$$

where a is a 2×2 submatrix given by $$a = \begin{bmatrix} 1 & T_s \\ 0 & 1 \end{bmatrix}$$

and $I_3$ is a 3×3 identity matrix. $T_s$ is the sampling period or time between observations. The plant equation is then given by $$\underline{x}(k+1) = A\underline{x}(k) + \underline{v}(k).$$

The plant or acceleration noise term, v(k), is required to account for unknown target accelerations and/or changes in the dipole moment. The acceleration noise is defined in terms of its covariance matrix $Q(k) = E\{\underline{v}(k)\underline{v}^T(k)\}$ and is used in prediction equations defining the Kalman filter.

The observed data are the outputs from M magnetometer sensors. Although the present invention may be applied to a 1, 2, or 3 dimensional magnetometer, the description of the magnetic object tracking algorithm 10 is given in terms of the 3 dimensional vector magnetometer. Let $\underline{b}$ represent the magnetic field responses from the M sensors:

$$\underline{b} = [b_{1i} \; b_{1j} \; b_{1k} \; b_{2i} \; b_{2i} \; b_{2j} \; b_{2k} \ldots b_{Mi} \; b_{Mj} \; b_{Mk}]^T$$

As before, the subscripts i,j,k represent orthogonal directions in a rectangular coordinate system of the magnetic field at the sensor. The magnetic response $\underline{b}$ is related to the state vector $\underline{x}$ through a nonlinear transformation F:

$$\underline{b} = F(\underline{r}_d, \underline{r}_s)\underline{m}$$

The vectors $\underline{r}_d$ and $\underline{m}$ represent the position and magnetic dipole components of the state vector $\underline{x}$, respectively; $\underline{r}_s$ is a vector of the M sensor positions. F is a 3M×3 position matrix that maps the dipole position and orientation to the magnetic response at each of the M sensors:

$$F = [f_1 \; f_2 \ldots f_M]^T$$

where $f_1$ represents the 3×3 position matrix associated with the $l^{th}$ sensor. The time index k has been left off the components of the sensor position vector $\underline{r}_s$ to simplify notation.

$$f_l = \frac{1}{r_l^5} \begin{bmatrix} 2r_{li}^2 - r_{lj}^2 - r_{lk}^2 & 3r_{li}r_{lj} & 3r_{li}r_{lk} \\ 3r_{li}r_{lj} & 2r_{lj}^2 - r_{li}^2 - r_{lk}^2 & 3r_{lj}r_{lk} \\ 3r_{li}r_{lk} & 3r_{lj}r_{lk} & 2r_{lk}^2 - r_{li}^2 - r_{lj}^2 \end{bmatrix}$$

$$\begin{bmatrix} r_{li} \\ r_{lj} \\ r_{lk} \end{bmatrix} = \begin{bmatrix} r_{di} \\ r_{dj} \\ r_{dk} \end{bmatrix} - \begin{bmatrix} r_{s_{li}} \\ r_{s_{lj}} \\ r_{s_{lk}} \end{bmatrix} \text{ and } r_l = \sqrt{r_{li}^2 + r_{lj}^2 + r_{lk}^2}$$

The observed magnetic response, in the presence of noise, is given by:

$$\underline{z}(k) = \underline{b}(k) + \underline{w}(k),$$

and substituting the expression for $\underline{b}(k)$ defined above, $$\underline{z}(k) = F(\underline{r}_d(k), \underline{r}_s)\underline{m}(k) + \underline{w}(k).$$

The sensor noise is modeled as a zero mean Gaussian process w(k) with covariance matrix $R(k) = E\{\underline{w}(k)\underline{w}^T(k)\}$. Since the observation equation is nonlinear (with respect to the dipole position components of the state vector), a first order extended Kalman filter is used to linearly approximate the observation equation. This requires a gradient of $F(r)\underline{m}$ with respect to each of the state components to be computed, and is used in the state covariance and Kalman gain equations in place of the observation matrix itself.

The set of prediction and update equations are given below. The prediction equations are as follows.

$$\hat{\underline{x}}(k+1|k) = A(k)\hat{\underline{x}}(k|k) \text{ (predicted state)}$$

$$P(k+1|k) = A(k)P(k|k)A^T(k) + Q(k) \text{ (predicted state error covariance matrix)}$$

where $$P(k|k) = E\{[\underline{x}(k) - \hat{\underline{x}}(k|k)][\underline{x}(k) - \hat{\underline{x}}(k|k)]^T\}$$

The update equations are as follows.

$$\hat{\underline{x}}(k-1|k+1) = \hat{\underline{x}}(k+1|k) + W(k+1)\{\underline{z}(k+1) - F(\underline{r}_d(k+1), \underline{r}_s)\underline{m}(k+1)\}$$

$$P^{-1}(k+1|k+1) = P^{-1}(k+1|k) + \nabla_{\underline{x}}[F(\underline{r})\underline{m}]_{\hat{\underline{x}}(k+1|k)}^T R^{-1}(k+1)\nabla_{\underline{x}}[F(\underline{r})\underline{m}]_{\hat{\underline{x}}(k+1|k)}$$

$$W(k+1) = P(k+1|k+1)\nabla_{\underline{x}}[F(\underline{r})\underline{m}]_{\hat{\underline{x}}(k+1|k)}^T R^{-1}(k+1)$$

The term $\nabla_{\underline{x}}[F(\underline{r})\underline{m}]_{\hat{\underline{x}}(k+1|k)}$ represents the gradient of $F(\underline{r})\underline{m}$ with respect to each of the state components evaluated at the predicted state $\hat{\underline{x}}(k+1|k)$. Since $F(\underline{r})\underline{m}$ is 3M×1, the gradient $\nabla_{\underline{r}}[F(\underline{r})\underline{m}]_{\hat{\underline{x}}(k+1|k)}$ is 3M×9 (one column for each partial derivative with respect to each of the 9 state vector components).

There are any number of ways to initialize the tracking process, which usually follows a detection process that declares new targets (magnetic dipole sources) as they enter the sensor array domain. Such detectors normally provide an initial estimate of dipole source location and moment vector. The source velocity may be initialized to zero or, alternatively, sequential detector estimates of position may be used to estimate the velocity.

The present invention is described in more detail below and performance results are presented for a specific application: the tracking of a motor vehicle using vector (3 axis) magnetic field data. The present invention was implemented in the MATLAB programming language and tested on a desktop Apple PowerMac™ 8100 computer.

The state includes the target position, velocity, and dipole moment in geodetic coordinates (i.e., in North, East, and Down directions). As presented in the general case, the equation describing the dynamics of the target state is given by:

$$\underline{x}(k+1) = A\underline{x}(k) + \underline{v}(k)$$

where $$\underline{x}(k) = [r_{dN}(k)\ \dot{r}_{dN}(k)\ r_{dE}(k)\ \dot{r}_{dE}(k)\ r_{dD}(k)\ \dot{r}_{dD}(k)\ m_N(k)\ m_E(k)\ m_D(k)]^T$$

and $$A = \begin{bmatrix} a & & & \\ & a & & \\ & & a & \\ & & & I_3 \end{bmatrix} \text{ with } a = \begin{bmatrix} 1 & T_s \\ 0 & 1 \end{bmatrix}.$$

In this case, the sampling period $T_s$ is 0.215 seconds. The acceleration noise terms in $Q(k) = E\{\underline{v}(k)\underline{v}^T(k)\}$ need to be tuned for this application. In this case, the magnetized target being tracked is a car traveling at relatively low speeds. Thus, the noise terms are simply made large enough to account for expected maneuvers performed during the test: e.g., the vehicle decelerating from a speed of 20 mph to a complete stop, accelerating to about 20 mph, and making left or right turns at low speeds. These target dynamics are assumed to occur primarily in a North-East plane and not in a Down direction and are modeled as such in the Q matrix. Simultaneously, an acceleration term needs to be defined for the magnetic dipole moment. A turn can profoundly change the target's magnetic dipole when viewed in a fixed coordinate system.

It is known that the magnetic dipole moment of a vehicle is generally the vector sum of two sources: the permanent or remanent magnetization forms a dipole moment vector that is constant in magnitude and fixed in orientation with respect to the vehicle structure, usually aligned more or less with the longitudinal axis of the vehicle; the induced magnetization forms a dipole moment vector that is more or less parallel to the background field vector (Earth's magnetic field) and increases or decreases in magnitude as the vehicle longitudinal axis rotates to become more parallel or more perpendicular to the background field vector, respectively. Thus, an alternative model for the dipole moment may be incorporated in the plant equations based on this behavior.

However, the present invention can be used in the absence of such a model. Given that a vehicle's magnetic dipole moment is nominally 1e6 nT-ft³, changes in dipole strength on the order of 1e6 nT-ft³ over several seconds need to be accounted for in the Q matrix since the transition matrix assumes a constant dipole moment over time. Based on these assumptions then, the following Q matrix was used on the data set in this case:

$$Q = \begin{bmatrix} q & & & \\ & q & & \\ & & .01q & \\ & & & q_M \end{bmatrix}$$

where q is a 2×2 submatrix associated with target accelerations along each dimension, and $q_M$ is a 3×3 submatrix which models the potential variation in magnetic dipole moment strength along each dimension. The terms in the $q_M$ matrix represent variances in the dipole moment and thus have units of (nT-ft³)²

$$q_M = \begin{bmatrix} 10^{10} & 0 & 0 \\ 0 & 10^{10} & 0 \\ 0 & 0 & 10^{10} \end{bmatrix}$$

$$q = \begin{bmatrix} \frac{T_s^4}{3} & \frac{T_s^3}{2} \\ \frac{T_s^3}{2} & T_s^2 \end{bmatrix}$$

The observed magnetic response in this example is an 18×1 vector $\underline{z}(k)$:

$$\underline{z}(k) = F(\underline{r}_d(k), \underline{r}_s)\underline{m}(k) + w(k).$$

Since the noise samples from the 6 sensors are assumed to be uncorrelated and identically distributed, the covariance matrix $R(k) = E\{\underline{w}(k)\underline{w}^T(k)\}$ is given by an identity matrix scaled by the noise power at the sensor (k is dropped since stationarity is assumed in the noise process w(k)):

$$R = \sigma_n^2 I.$$

The sensor noise variance was set at 2nT² in the covariance matrix R used for and Kalman gain updates. Having defined $R(k), Q(k), T_s$, the Kalman filter prediction and update equations are applied in this case.

The Kalman filter tracking capability was tested, and a summary of case runs is given in the following table, which is a summary of scenarios extracted from the test.

| Event No. | Vehicle | Sample No. | Course |
|---|---|---|---|
| 10 | Celica | 3000–3250 | East to south |
| 11 | Mazda | 3250–3450 | North to east |
| 12 | Celica | 3450–3700 | North to east |
| 13 | Celica | 9120–9250 | CCW outer loop |
| 14 | Celica | 9550–9750 | CCW outer loop |

The Kalman tracking results of the target kinematics are presented in FIGS. 2–6, along with position estimates associated with the prior art DMDL "snapshot" approach or algorithm for comparison to the Kalman tracker.

In general, the Kalman tracker performs at least as well as the corresponding DMDL snapshot algorithm. In most cases, smoother kinematic estimates associated with the Kalman tracker are readily apparent, particularly in FIGS. 3, 5, and 6. All vehicle trajectories were tracked with the same set of acceleration noise terms, observation noise terms, state transition matrix, and threshold values, suggesting a degree of robustness with the Kalman filter employed in the present algorithm 10.

In each of these cases, use of the magnetic object tracking algorithm 10 with an array of magnetometers will improve the tracking of magnetized targets over other approaches. The magnetic object tracking algorithm 10 requires less processing time, improves accuracy, and reduces latency over current swath tracking approaches, resulting in quicker response times in delivering time critical information to appropriate operators.

Thus, an algorithm, that may be implemented as an apparatus or a method, and that permits kinematic tracking of magnetized targets using magnetic field strength measurements from one or more vector magnetometers has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A magnetic object tracking algorithm for providing kinematic tracking of objects that generate a magnetic field using observed magnetic field strength measurements derived from one or more vector magnetometers, said algorithm comprising the steps of:

providing an array of observed magnetic field strength measurements derived from detecting the object's magnetic field using the one or more magnetometers;

selecting state variables including a dipole moment associated with the object that is to be tracked;

providing a Kalman filter defined by a plant equation that describes the evolution of a state vector of the object defined by the state variables and an observation equation that describes a relationship between the observed magnetic field strength measurements and the state vector that is tracked; and processing the array of magnetometer measurements using the Kalman filter to track the object.

2. The algorithm of claim 1 wherein the array of magnetometer measurements comprises an array of vector magnetometer measurements.

3. The algorithm of claim 1 wherein the array of magnetometer measurements comprises an array of total field magnetometer measurements.

4. The algorithm of claim 1 wherein the array of magnetometer measurements comprises an array of vector and total field magnetometer measurements.

5. The algorithm of claim 1 wherein the state vector is defined by state variables including object position, velocity, and magnetic dipole moment.

6. The algorithm of claim 5 wherein the state vector is further defined by an object acceleration state variable.

7. The algorithm of claim 5 wherein the state vector is further defined by time derivatives of the magnetic dipole moment.

8. The algorithm of claim 1 wherein the plant equation is based on a constant velocity model for the kinematics of the object and a static model for the magnetic dipole moment characteristics of the object.

9. The algorithm of claim 1 wherein the state vector and plant equations are defined by two vector components of the dipole moment consisting of remanent and induced magnetizations.

10. The algorithm of claim 1 wherein the state vector is defined by state variables including higher order magnetic multipole moments.

11. The algorithm of claim 1 wherein the observed field strength measurements are the amplitude and relative phase of an alternating magnetic field, and wherein the state vector is defined by state variables including an alternating magnetic dipole moment.

12. Magnetic object tracking apparatus for providing kinematic tracking of objects that generate a magnetic field using observed magnetic field strength measurements, said apparatus comprising:

one or more vector magnetometers for providing an array of observed magnetic field strength measurements derived from detecting the object's magnetic field;

a Kalman filter defined by a plant equation that describes the evolution of a state vector of the object defined by the state variables, including its magnetic dipole moment, associated with the object that is to be tracked and an observation equation that describes a relationship between the observed magnetic field strength measurements and the state vector that is tracked; and a processor for processing the array of magnetometer measurements using the Kalman filter to track the object.

13. The apparatus of claim 12 wherein the array of magnetometer measurements comprises an array of vector magnetometer measurements.

14. The apparatus of claim 12 wherein the array of magnetometer measurements comprises an array of total field magnetometer measurements.

15. The apparatus of claim 12 wherein the array of magnetometer measurements comprises an array of vector and total field magnetometer measurements.

16. The apparatus of claim 12 wherein the state vector is defined by state variables selected from the group including object position, velocity, and magnetic dipole moment object acceleration, and time derivatives of the magnetic dipole moment.

17. The apparatus of claim 12 wherein the plant equation is based on a constant velocity model for the kinematics of the object and a static model for the magnetic dipole moment characteristics of the object.

18. The apparatus of claim 12 wherein the state vector and plant equations are defined by two vector components of the dipole moment consisting of remanent and induced magnetizations.

19. The apparatus of claim 12 wherein the state vector is defined by state variables including higher order magnetic multipole moments.

20. The apparatus of claim 12 wherein the observed field strength measurements are the amplitude and relative phase of an alternating magnetic field, and wherein the state vector is defined by state variables including an alternating magnetic dipole moment.

* * * * *